UNITED STATES PATENT OFFICE.

JOSEPH M. TRIMBLE, OF MEMPHIS, TENNESSEE, ASSIGNOR OF ONE-HALF TO WILLIAM K. BURTON, OF MEMPHIS, TENNESSEE.

CHEWING-GUM.

1,078,564.     Specification of Letters Patent.     Patented Nov. 11, 1913.

No Drawing.     Application filed January 4, 1912.     Serial No. 669,483.

*To all whom it may concern:*

Be it known that I, JOSEPH M. TRIMBLE, a citizen of the United States, residing at Memphis, in the county of Shelby and State of Tennessee, have invented certain new and useful Improvements in Chewing-Gum, of which the following is a specification.

My invention relates to an improved chewing gum and its object is to provide a wholesome and palatable chewing gum compound employing normally unpalatable asphalt as the principal ingredient.

The invention also relates to a method of treating the normally unpalatable asphalt to render it capable of use in a chewing gum compound.

The asphalt referred to is that such as the Trinidad and Bermudez type, which in its crude state, has a disagreeable pungent taste and odor which renders it unfit for use in a chewing gum while in such crude or normal state. This type of asphalt before being capable of performing the object specified, must be deodorized and rendered tasteless and according to my discovery this end may be attained by boiling the asphalt in a suitable deodorizing and taste destroying agent or agents which may consist of a strong infusion or infusions such as spicewood, sassafras and mints. To the infusion in which the asphalt is placed any preferred flavoring extract such as peppermint and wintergreen may be added while the infusion is boiling and the mixture is allowed to boil until the odor and pungent taste of the asphalt is entirely destroyed.

The proportion of the asphalt used is greatly in excess of that of any other ingredient. To the asphalt after the addition of the flavoring and while still boiling a small amount of balsam tolu or chicle and beeswax may be added. A small quantity of sugar is worked into the mixture while just below the boiling point.

The normally unpalatable asphalt treated as described forms in itself a sufficiently pliable and elastic base for a chewing gum. This pliable and elastic base enables tempering gums, such as are employed in most chewing gums, and which are expensive, to be dispensed with entirely or to a great extent and the cost of manufacture accordingly decreased. The asphalt herein referred to is inexpensive and as it forms an ingredient greatly in excess of the other ingredients, the chewing gum may be manufactured at slight cost.

The following formula provides for a desirable chewing gum which employs the asphalt treated as described.

Treated asphalt ---------------- 90%
Balsam tolu or chicle ---------- 5%
Beeswax ------------------------ 2%
Sugar -------------------------- 3%

It is to be understod that various formulas for chewing gum compounds which call for the asphalt described, may be used without departing from the scope of the following claims.

Having thus described my invention, what I claim is:—

1. Chewing gum comprising as its base deodorized asphalt prepared by boiling with an appropriate deodorizing agent, substantially as set forth.

2. Chewing gum comprising as a base asphalt prepared by boiling in an infusive agent combined with a flavoring extract, substantially as set forth.

3. The process of manufacturing chewing gum comprising treating normally unpalatable asphalt by boiling in a deodorizing infusion having a flavoring extract and combining with other ingredients, substantially as set forth.

4. The process of treating normally unpalatable asphalt by boiling the asphalt in a deodorizing and taste destroying agent.

In testimony whereof I have affixed my signature in presence of two witnesses.

JOSEPH M. TRIMBLE.

Witnesses:
 JOHN W. FARLEY,
 S. W. JONES.